US007514109B2

(12) United States Patent
Lee et al.

(10) Patent No.: US 7,514,109 B2
(45) Date of Patent: Apr. 7, 2009

(54) METHOD FOR PRODUCING KOJI OF HOT PEPPER PASTE (GOCHUJANG) WITH REDUCED HOTNESS, KOJI PRODUCED BY THE METHOD, AND HOT PEPPER PASTE PREPARED FROM THE KOJI

(75) Inventors: Seung Jin Lee, Chungcheongnam-do (KR); Min Su Han, Seoul (KR); Yeong Il Chang, Daejeon (KR)

(73) Assignee: Haechandle Co., Ltd., Daejeon (KR)

( * ) Notice: Subject to any disclaimer, the term of this patent is extended or adjusted under 35 U.S.C. 154(b) by 355 days.

(21) Appl. No.: 10/411,751

(22) Filed: Apr. 10, 2003

(65) Prior Publication Data
US 2004/0126458 A1 Jul. 1, 2004

(30) Foreign Application Priority Data
Dec. 31, 2002 (KR) .................. 10-2002-0088302

(51) Int. Cl.
*A23L 1/22* (2006.01)
*A23K 1/00* (2006.01)
(52) U.S. Cl. ........................ 426/49; 426/52
(58) Field of Classification Search .............. 426/18, 426/44, 46, 52, 60–63, 589, 49, 129, 198; 435/198, 129
See application file for complete search history.

(56) References Cited

U.S. PATENT DOCUMENTS

| 4,308,284 A | * | 12/1981 | Noda et al. | 426/7 |
| 4,329,370 A | * | 5/1982 | Noda et al. | 426/46 |
| 5,520,933 A | * | 5/1996 | Yoshida et al. | 426/7 |
| 5,980,957 A | * | 11/1999 | Nishinomiya et al. | 426/46 |
| 6,022,718 A | * | 2/2000 | Iwai et al. | 435/129 |
| 6,383,532 B1 | * | 5/2002 | Lim et al. | 426/52 |
| 2002/0160079 A1 | * | 10/2002 | Kim et al. | 426/44 |

FOREIGN PATENT DOCUMENTS

| JP | 407236448 A | * | 9/1995 |
| KR | 9205367 A | * | 7/1992 |
| KR | 9205367 B | * | 7/1992 |
| KR | 9302025 B | * | 3/1993 |
| KR | 2002012624 A | * | 2/2002 |

OTHER PUBLICATIONS

Steinkraus, K.H., Handbook of Indigenous Fermented Foods (Second Edition), 1995, pp. 559-564.*
H. Onozaki et al., "Hydrolytic Degradation of Capsaicin by *Aspergillus niger* and *Aspergillus oryzae*," *J. Ferment. Technol.*, vol. 54, No. 5, 1976, pp. 297-301.
Taik-Soo Lee and Yoon-Joong Park, "Studies on the Effects of Red Pepper Powder on the Enzyme Production and Growth of *Aspergillus oryzae*," *J. Korean Agric. Chem. Soc.*, vol. 19, No. 4, Dec. 1976, pp. 227-232.
Ik Soo Lee and Sang Sup Lee, "Microbial Transformation Mechanism of Capsaicinoids," *J. Pharm. Soc. Korea*, vol. 31, No. 5, 1987, pp. 280-285.
Dong-Ho Woo and Jae-Ook Kim, "Characteristics of Improved Kochujang," *J. Korean Agric. Chem. Soc.*, 33(2), 1990, pp. 161-168.

* cited by examiner

*Primary Examiner*—Keith D Hendricks
*Assistant Examiner*—Jyoti Chawla
(74) *Attorney, Agent, or Firm*—Martine Penilla & Gencarella, LLP

(57) ABSTRACT

A method for producing a koji of a hot pepper paste with reduced capsaicin and/or dihydrocapsaicin content through action of enzymes secreted from a koji fungus includes adding a koji fungus to starting material for preparation of koji of hot pepper paste, and adding a predetermined amount of hot peppers one or more times to the material during the cultivating step performed by enzymes secreted from the koji fungus. The method can reduce the hotness of a hot pepper paste, while maintaining the intrinsic colors of traditional hot pepper pastes. Accordingly, it is possible to prepare various hot pepper paste products satisfying customer's diverse needs.

7 Claims, 2 Drawing Sheets

METHOD FOR PRODUCING KOJI OF HOT PEPPER PASTE (GOCHUJANG) WITH REDUCED HOTNESS, KOJI PRODUCED BY THE METHOD, AND HOT PEPPER PASTE PREPARED FROM THE KOJI

BACKGROUND OF THE INVENTION

1. Field of the Invention

The present invention relates to a method for producing a koji of a hot pepper paste (called "gochujang" in Korea) with reduced hotness, a koji produced by the method, and a hot pepper paste prepared from the koji. More particularly, the present invention relates to a method for removing ingredients which cause hotness in traditional hot pepper pastes (Gochujang) while maintaining intrinsic colors of traditional hot pepper pastes(Gochujang), a koji produced by the method, and a hot pepper paste prepared from the koji.

2. Description of the Related Art

In general, hot pepper (botanical name: *capsicum annuum* L.) is a raw material for food spices, and widely used as a seasoning for hot pepper pastes(Gochujang), kimchi (Korean pickled vegetable), salted fishes, etc., in Korea. Hot pepper has occupied an important position in Korean dietary life. A main ingredient of hot pepper is capsaicin, which tastes hot. Capsaicin is a condensation product of 1-carboxylic acid having unsaturated aliphatic chain and vanillylamide. It is known that capsaicin analogues have a vanillylamine moiety to have hot taste, and exhibit maximum hotness when the acid moiety has 9 or 10 carbon atoms [1].

The capsaicin content of hot pepper varies depending on variations and growing districts of the hot pepper. By variations, there are, for example, paprika with no hotness and very hot habanero. Capsaicin is more abundant in the placenta of hot pepper than its pericarp and the seed.

Hot peppers produced in Cholla province, Korea, are smaller in size but have more capsaicin content than those produced in Chungchong province, Korea. The hot peppers produced in Chungchong province are large in size but have less hot taste. In addition, they have an excellent effect on coloring of hot pepper pastes. Hot peppers used for the preparation of kimchi and hot pepper pastes must meet various requirements, i.e. flavor, color, hotness, in this order. Recent consumer tastes have toward mildly hot taste. That is, hotness becomes less important, while color becomes more and more important.

Few efforts to develop novel variations reflecting this recent trend have been made. Even hot pepper paste-related industries make no effort to change the taste of hot pepper pastes toward mildness. Lee and Park reported that as the concentration of hot pepper powders in a koji increases (to 20%), titers of saccharifying amylase and protease considerably decrease [2]. Woo and Kim's report suggested that since low titer of protease affects decomposition of protein during maturation, hot pepper powders must be added after decomposition by protein enzymes [3]. These reports are limited to enzymatic activities according to the amount of hot pepper powders added.

Lee described in the report entitled [Effects of Meju (fermented soybeans) on capsaicin] that as a result of comparing loss in hotness according to the amount of capsaicin before and after fermentation of a hot pepper paste, the loss in hotness is mainly caused by enzymatic action [4]. Lee et al. reported that *A. niger*, *A. nidulans*, etc., hydrolyze capsaicin and nonoylvanillylamide into N-vanillylcarbamoyl butyric acid through ω-hydroxylation, followed by β-oxidation. They introduced 30 species including 14 members of the genus *Aspergillus* undergoing the metabolic pathway discussed above, and further suggested potential 5 species [5]. Ono et al. reported that *Aspergillus* strains (*A. niger* R-1 and *A. oryzae* R-2) decompose capsaicin using a koji extract to form vanillylamine or separate a fatty acid at the side chain of capsaicin, and particularly, *A. niger* R-1 converts vanillyl-n-nonoylamide to vanillyl amine and pelargonic acid [6].

In spite of results of the above-mentioned reports, no specific plans for efficiently utilizing the results have been established. Since enzymatic action for reducing hotness has been utilized only in the step of retting a hot pepper paste, there is a disadvantage in terms of low reduction of hotness.

SUMMARY OF THE INVENTION

The present inventor has conducted intensive research to solve the above-mentioned problems occurring in the preparation of traditional hot pepper pastes and develop a method capable of meeting recent demands for good taste and color of hot pepper pastes. As a result, the present inventor have found that the hotness of a hot pepper can be reduced by enzymatic action in the production step of a koji, and accomplished the present invention.

Therefore, it is an object of the present invention to provide a method for producing a koji of a hot pepper paste which can reduce hotness of traditional hot pepper pastes while maintaining intrinsic color of traditional hot pepper pastes.

It is another object of the present invention to provide a koji produced by the method capable of reducing hotness of traditional hot pepper pastes while maintaining intrinsic color of traditional hot pepper pastes.

It is yet another object of the present invention to provide a hot pepper paste with reduced hotness through enzymatic action while maintaining intrinsic color of traditional hot pepper pastes.

In accordance with one aspect of the present invention, there is provided a method for producing a koji of a hot pepper paste with reduced capsaicin and/or dihydrocapsaicin content through action of enzymes secreted from a koji fungus, comprising adding a predetermined amount of hot pepper powders once or more time to a starchy raw material in any one of a preparatory step, a cultivating step and a finishing step.

In accordance with another aspect of the present invention, there is provided a koji of a hot pepper paste with reduced capsaicin and/or dihydrocapsaicin content through action of enzymes secreted from a koji fungus, wherein the koji is produced by adding a predetermined amount of hot pepper powders once or more time to a starchy raw material in any one of a preparatory step, a cultivating step and a finishing step.

In accordance with yet another aspect of the present invention, there is provided a hot pepper paste prepared using the koji.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
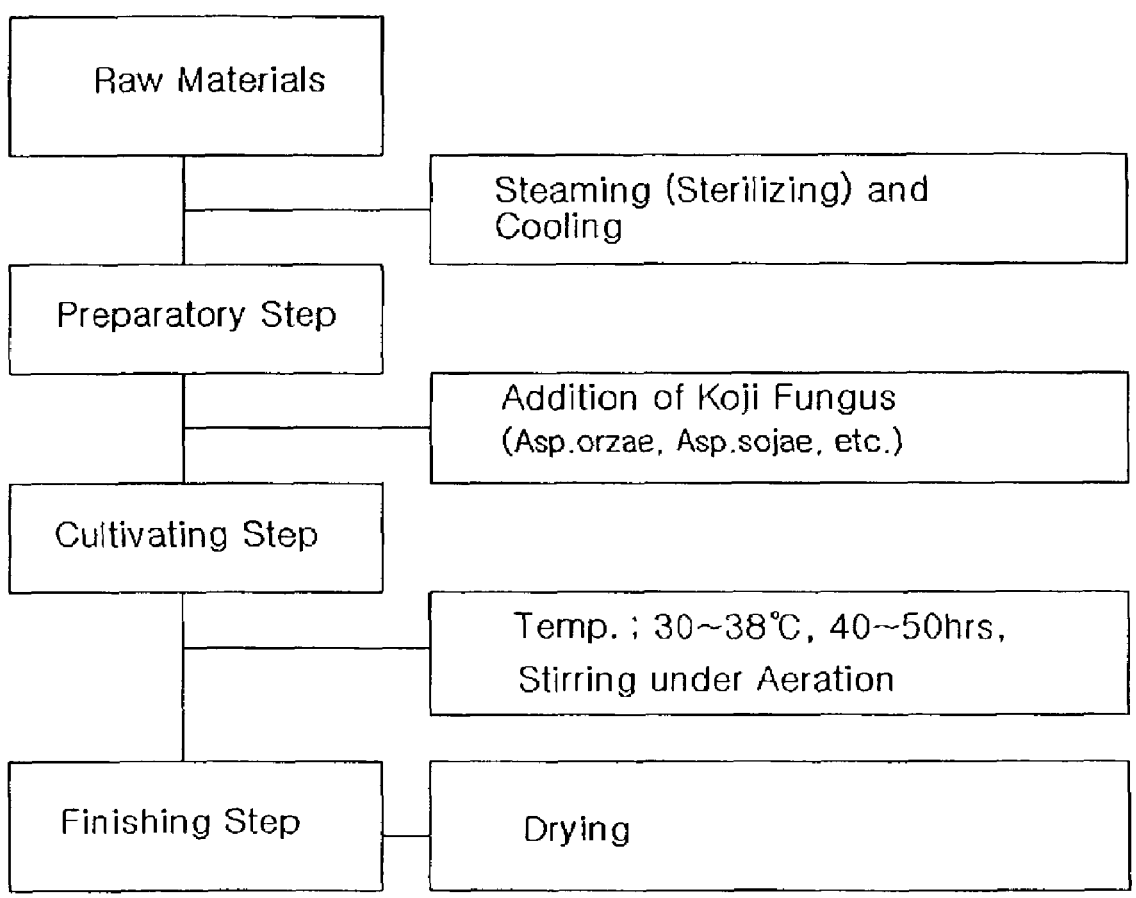
FIG. 1 is a process chart showing a traditional method for producing a koji.

A process chart of a traditional method for producing a koji is shown in FIG. 1. Koji is a mass produced by inoculating and cultivating a koji fungus in a steamed starchy raw material including grains and beans as main ingredients. The koji is commonly produced through a preparatory step, a cultivating step and a finishing step, in this order.

Traditional methods for preparing a hot pepper paste, although varying slightly, commonly include the steps of: producing a koji; steaming (gelatinizing) an aqueous starchy raw material and protein raw material solution to obtain a steamed raw material; mixing the koji, the steamed raw material, a saline solution and hot pepper powders, and retting and maturing. If necessary, the method further includes the step of adding hot pepper powders to the retted mixture after maturation.

Figure 2:
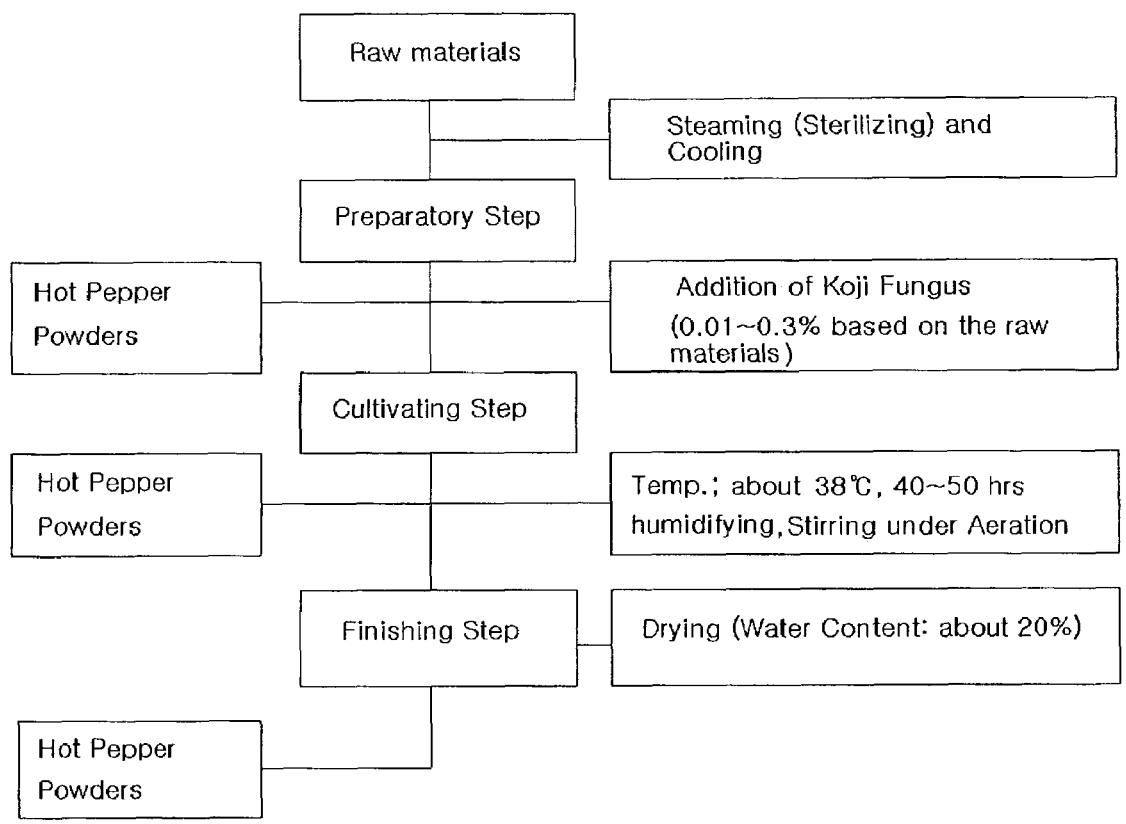
FIG. 2 is a process chart showing a method for producing a koji according to the present invention.

The essential technical feature of the present invention resides in the addition of hot pepper powders in the cultivating step, instead of in the retting step (FIG. 2). The other steps except for the cultivating step are beyond the scope of the present invention. Accordingly, various modifications of these steps can be freely made by those skilled in the art. Hereinafter, the present invention will be described in detail below in terms of a method for producing a koji. Steps for preparing a hot pepper paste from the koji will be described with reference to preferred Examples of the present invention.

Hot pepper powders used in the present invention may be those commonly used in the preparation of traditional hot pepper pastes. Hot pepper powders used in the present invention are not particularly limited in terms of their variations and sizes. Commercially available hot pepper powders may be used.

The content of hot pepper powders in the koji is not particularly limited. Considering quality and hotness of a final hot pepper paste, the content of hot pepper powders in the koji is in the range of from 1% to 50% by weight, based on the total weight of the koji (including hot pepper powderd).

The hotness of a hot pepper is determined within the range of from 0 to $16 \times 10^6$ SHU ratings. SHU rating was developed by Scoville, who pharmacologically researched ingredients of hot peppers. By Korean districts, hot peppers produced in north Kyungsang province have 5,000~6,000 SHU ratings, and those produced in Cholla province 20,000~30,000 SHU ratings.

The starchy raw material may include all materials used in traditional methods for producing a koji. Representative examples of materials which can be included in the starchy raw material are grains and beans. The grains include at least one raw material selected from wheat, wheat bran, highly milled grain, rice, barley, sorghum, corn, oat, buckwheat, millet and processed products thereof. The beans include at least one raw material selected from soybean, soybean flour, defatted soybean meal, kidney bean, mung bean and processed products thereof. In addition, the grains or the beans may be used either alone or in combination.

The processed products of the grains and the beans refer to raw materials which help the functions of the steamed (or gelatinized) raw materials and the koji.

The amount of the starchy raw material required for the production of the koji is well known in the art. Since the amount of starchy raw material are specifically referred in the following preferred Examples, detailed description thereof is omitted.

Any strains can be used as the koji fungus, so long as the strains can be used for the preparation of common hot pepper pastes and can secrete enzymes capable of reducing capsaicin and/or dihydrocapsaicin.

Examples of the koji fungus include *Aspergillus oryzae*, *Aspergillus sojae*, *Aspergillus niger*, *Aspergillus usami*, *Aspergillus niger* mut. *Kawachi*, *Aspergillus awamori*, *Aspergillus tamarii*, *Aspergillus nidulance*, *Aspergillus giganteus*, *Aspergillus fisheri*, *Aspergillus versicolor*, *Aspergillus unguis*, *Aspergillus flavipes*, *Aspergillus alliaceus*, *Aspergillus foetidus*, *Aspergillus luchuensis*, *Aspergillus sclerotiorum*, *Aspergillus kanagawaensis*, *Aspergillus ustus* and *Aspergillus aeneus*. The koji fungus may be used either alone or in combination.

The amount of the koji fungus added can varies widely depending on the variations of the strains. Preferably, prior to the cultivating step, the koji fungus is added in an amount of 0.01~0.3% by weight, based on the total weight of the raw materials. When the amount is less than 0.01% by weight, the enzymatic action is insufficiently performed. When the amount is more than 0.3% by weight, additional enzymatic action does not occur.

The hot pepper powders can be added over the entire time ranging from early stage of the cultivating step to the finishing step. However, in the case of adding hot pepper powders at the end of the finishing step, effect on reduction of hotness is slightly lowered. Accordingly, the addition of hot pepper powders in the early stage of the cultivating step is preferred because action of enzymes secreted during cultivation of the koji fungus is maximized.

The addition of hot pepper powders is not particularly limited in terms of its frequency. Considering enzymatic action, the hot pepper powders can be added in installments over all steps.

Hereinafter, the present invention will be described in more detail with reference to the following Examples. However, these examples are given for the purpose of illustration and are not to be construed as limiting the scope of the invention.

EXAMPLE 1

First, 2 kg of wheat flour was mixed with 830 g of water. The slurry was put into a burlap bag (cotton cloth) and placed in a 3 cm-deep tray. The slurry was steamed at 121° C. for 15 minutes and then allowed to cool to 30° C. To the steamed slurry, 0.3 g of *Aspergillus oryzae* (Chung-Moo Fermentation Company) as a koji fungus and 500 g of hot pepper powders (11,800 SHU) were added and homogeneously mixed. The resulting mixture was spread on a tray (40 cm×30 cm×8 cm), and then cultivated in an incubator at 30° C. (final water content: 35% by weight). During cultivation, the culture was stirred under aeration so as not to raise to a temperature above 40° C. Water was sprayed on the culture to maintain moisture conditions necessary for growth of the koji fungus. The cultivation was further continued for 50 hours to produce a koji of a hot pepper paste.

The hotness of the koji thus produced was calculated by the AOAC method using high performance liquid chromatography (HPLC) (Final hotness: 35 SHU, Decomposition rate: 98%).

EXAMPLE 2

A koji was produced in the same manner as in Example 1, except that 1,000 g of hot pepper powders (11,800 SHU) was used (Final hotness: 176 SHU, Decomposition rate: 95%).

EXAMPLE 3

A koji was produced in the same manner as in Example 1, except that 1,000 g of hot pepper powders was added after 20 hours of cultivation (Final hotness: 2,096 SHU, Decomposition rate: 41%).

EXAMPLE 4

A koji was produced in the same manner as in Example 1, except that 1,000 g of hot pepper powders was added after 42 hours of cultivation (Final hotness 3,360 SHU, Decomposition rate: 5%).

EXAMPLE 5

Highly milled grain, saline and clean water were added to the koji produced in Example 1 (in an amount of 37% by weight relative to the total weight of the mixture), retted, and fermented at 30° C. for 20 days. The fermented mixture was sterilized at 60° C. for 30 minutes to prepare a hot pepper paste (Hotness: 13 SHU).

EXAMPLE 6

A hot pepper paste (Hotness: 624 SHU) was prepared in the same manner as in Example 5, except that the koji produced in Example 2 was used.

EXAMPLE 7

A hot pepper paste (Hotness: 768 SHU) was prepared in the same manner as in Example 5, except that the koji produced in Example 3 was used.

EXAMPLE 8

A hot pepper paste (Hotness: 1216 SHU) was prepared in the same manner as in Example 5, except that the koji produced in Example 4 was used.

As can be seen from the foregoing, the koji produced in Example 2 containing higher content of hot pepper powders exhibited lower initial decomposition rate of main ingredients causing hotness than that produced in Example 1. However, both kojis exhibited the same decomposition rate (95%) after 50 hours of cultivation. Comparing decomposition rates in terms of time, the kojis (Examples 3 and 4) produced by adding hot pepper powders during cultivation exhibited lower decomposition rates than the kojis (Examples 1 and 2) produced by adding hot pepper powders in the early stage of the cultivation. However, it was observed that the kojis produced in Examples 3 and 4 had a slight effect on reduction of hotness.

In addition, the hot pepper pastes prepared in Examples 5 and 6 exhibited low SHU ratings, but those of Examples 7 and 8 exhibited relatively high SHU ratings.

Consequently, it has been found that the addition of hot pepper powders in the early stage of cultivation is advantageous in terms of greatly reducing the hotness of hot pepper pastes. On the other hand, hot pepper powders may be appropriately added in any step in order to obtain a desired hotness.

The method for producing a koji according to the present invention can reduce hotness of a hot pepper paste through action of enzymes secreted from the koji, while maintaining intrinsic colors of traditional hot pepper pastes. In addition, according to the present invention, it is possible to prepare various hot pepper paste products satisfying customer's diverse needs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

REFERENCES

1. Staudinger, Muller, Ber, 699 (56), 1923
2. Lee Taek-Soo, Park Yoon-Jung, Journal of the Korean Society of Agricultural Chemistry and Biotechnology, 19(4), 227~232, 1976
3. Woo Dong-Ho, Kim Jae-Ook, Journal of the Korean Society of Agricultural Chemistry and Biotechnology, 33(2), 160-468, 1990
4. Lee Sang-Sub, Journal of the Pharmaceutical Society of Korea, 1957
5. Lee Jk-Soo, Lee Sang-Sub, Journal of the Pharmaceutical Society of Korea, 31(5), 280~285, 1987
6. Onozaki et al. J. Ferment. Technol., Vol. 54, No. 5, p. 297~301, 1976

What is claimed is:

1. A method for producing a koji of a hot pepper paste with reduced capsaicin and/or dihydrocapsaicin content through action of enzymes secreted from a koji fungus, comprising:
    adding a koji fungus to a starting material for preparation of a koji of hot pepper paste; and
    adding a predetermined amount of hot pepper powders one or more times to the starting material in a cultivating step of the koji fungus during which the predetermined amount of hot pepper powders is added to the starting material up to 20 hours after starting the cultivating step and wherein the cultivating step performed by enzymes secreted from the koji fungus occurs after a preparatory step and before a finishing step in the production of the koji.

2. The method for producing a koji of a hot pepper paste according to claim 1, wherein the koji fungus is at least one strain selected from the group consisting of *Aspergillus oryzae, Aspergillus sojae, Aspergillus niger, Aspergillus usami, Aspergillus niger* mut. Kawachi, *Aspergillus awamori, Aspergillus tamarii, Aspergillus nidulance, Aspergillus giganteus, Aspergillus fisheri, Aspergillus versicolor, Aspergillus unguis, Aspergillus flavipes, Aspergillus alliaceus, Aspergillus foetidus, Aspergillus luchuensis, Aspergillus sclerotiorum, Aspergillus kanagawaensis, Aspergillus ustus,* and *Aspergillus aeneus.*

3. The method for producing a koji of a hot pepper paste according to claim 1, wherein the starting material is comprised of grains.

4. The method for producing a koji of a hot pepper paste according to claim 1, wherein the starting material is comprised of beans.

5. The method for producing a koji of a hot pepper paste according to claim 1, wherein the starting material is comprised of a mixture of grains and beans.

6. The method for producing a koji of a hot pepper paste according to claim 3 or 5, wherein the grain is selected from the group consisting of wheat, wheat bran, highly milled grain, rice, barley, sorghum, corn, oat, buckwheat, and millet.

7. The method for producing a koji of a hot pepper paste according to claim 4 or 5, wherein the beans are selected from the group consisting of soybeans, soybean flour, defatted soybean meal, kidney beans, and mung beans.

\* \* \* \* \*